(12) United States Patent
Jiang et al.

(10) Patent No.: US 11,596,114 B2
(45) Date of Patent: Mar. 7, 2023

(54) FLOATING ISLAND CONSTRUCTION METHOD FOR OVERALL TRANSPLANTATION OF SANDY SOIL PLANTS

(71) Applicant: CHINA RENEWABLE ENERGY ENGINEERING INSTITUTE, Beijing (CN)

(72) Inventors: Hao Jiang, Beijing (CN); Bo Lu, Beijing (CN); Baiyan Chen, Beijing (CN)

(73) Assignee: CHINA RENEWABLE ENERGY ENGINEERING INSTITUTE, Beijing (CN)

( * ) Notice: Subject to any disclaimer, the term of this patent is extended or adjusted under 35 U.S.C. 154(b) by 0 days.

(21) Appl. No.: 17/760,896

(22) PCT Filed: Mar. 3, 2021

(86) PCT No.: PCT/CN2021/078840
§ 371 (c)(1),
(2) Date: Mar. 16, 2022

(87) PCT Pub. No.: WO2021/175241
PCT Pub. Date: Sep. 10, 2021

(65) Prior Publication Data
US 2022/0338425 A1 Oct. 27, 2022

(30) Foreign Application Priority Data
Mar. 3, 2020 (CN) .......................... 202010137322.6

(51) Int. Cl.
*A01G 9/28* (2018.01)
*B63B 75/00* (2020.01)
(Continued)

(52) U.S. Cl.
CPC ................ *A01G 9/28* (2018.02); *B63B 35/38* (2013.01); *B63B 35/44* (2013.01); *B63B 75/00* (2020.01); *B63B 2035/4493* (2013.01)

(58) Field of Classification Search
CPC .......... A01G 8/28; B63B 35/44; B63B 35/38; B63B 75/00; B63B 2035/4493
See application file for complete search history.

(56) References Cited

U.S. PATENT DOCUMENTS

| | | | |
|---|---|---|---|
| 6,025,042 A * | 2/2000 | Kligman ................. | A41G 1/00 428/26 |
| 6,986,845 B2 * | 1/2006 | DeBusk .................... | C02F 3/32 210/601 |

(Continued)

FOREIGN PATENT DOCUMENTS

| | | |
|---|---|---|
| CN | 1689991 A | 11/2005 |
| CN | 101333041 A | 12/2008 |

(Continued)

OTHER PUBLICATIONS

International Search Report, issued in PCT/CN2021/078840, PCT/ISA/210, dated May 27, 2021.
(Continued)

*Primary Examiner* — S. Joseph Morano
*Assistant Examiner* — Jovon E Hayes
(74) *Attorney, Agent, or Firm* — Birch, Stewart, Kolasch & Birch, LLP

(57) ABSTRACT

Disclosed is a floating island construction method for overall transplantation of sandy soil plants, the method comprising the following steps: separation from a surrounding soil body; construction of a buoyancy tank device (13); and waterproof construction, so as to construct a plant floating island from plants to be transplanted in a reservoir area. The floating island protects all the root systems of the plants and most of the undisturbed soil, improves the survival rate,
(Continued)

preserves the unique landscape of an original habitat, and can be constructed at the same time as water conservancy project construction, which saves on the construction period, saves costs, and is convenient for on-site overall scheduling.

2 Claims, 5 Drawing Sheets

(51) Int. Cl.
  *B63B 35/38* (2006.01)
  *B63B 35/44* (2006.01)

(56) References Cited

U.S. PATENT DOCUMENTS

| | | | |
|---|---|---|---|
| 7,448,163 B2* | 11/2008 | Beeman | A01G 9/00 47/60 |
| 7,784,218 B2* | 8/2010 | Kania | A01G 9/28 47/65.5 |
| 7,789,043 B2* | 9/2010 | Kania | A01K 61/60 119/221 |
| 8,382,982 B2* | 2/2013 | Hondulas | C02F 3/109 210/242.1 |
| 8,691,092 B2* | 4/2014 | Streb | C02F 3/327 210/615 |
| 9,181,105 B2* | 11/2015 | Kania | A01G 31/02 |
| 11,034,415 B2* | 6/2021 | Boswell | C04B 28/04 |
| 2004/0020116 A1* | 2/2004 | Schuck | A01G 9/02 47/65.5 |
| 2004/0187418 A1* | 9/2004 | Day | B44C 5/00 52/311.1 |
| 2009/0139927 A1* | 6/2009 | Kania | A01G 31/00 210/242.1 |
| 2009/0288341 A1* | 11/2009 | Kania | A01G 9/28 47/64 |
| 2010/0075400 A1* | 3/2010 | Kania | A01G 9/28 114/294 |
| 2010/0088955 A1* | 4/2010 | Kania | B63B 35/34 427/421.1 |
| 2013/0125825 A1* | 5/2013 | Kania | E02B 3/046 119/221 |

FOREIGN PATENT DOCUMENTS

| | | | | |
|---|---|---|---|---|
| CN | 102870645 A | | 1/2013 | |
| CN | 203781920 U | | 8/2014 | |
| CN | 104176830 A | | 12/2014 | |
| CN | 106956753 A | | 7/2017 | |
| CN | 108901450 A | | 11/2018 | |
| CN | 109368794 A | | 2/2019 | |
| CN | 208500522 U | | 2/2019 | |
| CN | 111357601 A | * | 7/2020 | ............ A01G 22/00 |
| JP | 8-133178 A | | 5/1996 | |
| JP | 08133178 A | * | 5/1996 | ............ A01Q 22/00 |
| JP | 2017-137048 A | | 8/2017 | |
| KR | 10-0924538 B1 | | 11/2009 | |
| KR | 10-2011-0085673 A | | 7/2011 | |

OTHER PUBLICATIONS

Office Action and Search Report for CN 202010137322.6, dated May 27, 2021, with translation.

* cited by examiner

A-A

B-B

C-C

D-D

FLOATING ISLAND CONSTRUCTION METHOD FOR OVERALL TRANSPLANTATION OF SANDY SOIL PLANTS

FIELD OF THE INVENTION

The invention provides a floating island construction method for integrally transplanting plants in a reservoir area during the construction of a water conservancy and hydropower project, which belongs to the field of environmental protection of water conservancy and hydropower projects.

BACKGROUND OF THE INVENTION

During the construction of the reservoir, large tracts of land upstream will be submerged to form the reservoir area. The endangered plants in the reservoir area need to be transplanted. For single or scattered plants, traditional transplanting methods are generally used. Keep the plant's root system as much as possible, separate the plant's root system from the soil, and transport the plant to a reserved area. However, it is more difficult to transplant large-scale plants individually with landscape function, or the plants need unique habitats. On the one hand, the cost of transplanting a single plant is very high, and the transplanting of large-scale plants is often sky-high; on the other hand, the survival rate of transplanting cannot be guaranteed since the roots of large-scale plants are entangled with each other. There is often no way to separate the roots of different plants clearly. The loss of the root system is significant, and many plants cannot survive after transplanting due to root damage; more importantly, the original habitat and landscape cannot be preserved after single-plant transplanting, the entire vegetation will be abandoned, and it isn't easy to ensure the actual value of habitat and landscape.

Some plants occupy an important ecological position in the river reach habitats near the reservoir area. If we use transplanting as a preserve plan, it will be migrated near the river. Mainly to avoid submerging caused by water filling in the reservoir. There is no help for the environmental and ecological conservation around the reservoir area. Therefore, the best protection mode is in situ reserve.

SUMMERY OF THE INVENTION

Technical Problem

The technical problem to be solved by the present invention is: to propose an overall migrating plan with the subgrade. The main content of this plan is to construct a floating island for the endangered plants and their accompanying plant to be transplanted in the reservoir area. The advantages include: the in-situ plants are protected together, keeping the original plants' pattern, the original environment can be maintained to the maximum extent; furthermore, the original habitat of the river section can be localized reserved to some extent. At the same time, it can reduce the expense of transplanting and improve the survival rate of transplanting.

The Solution to the Problem

The invention discloses a floating island construction method for the integral transplantation of sandy soil plants.

Specifically, it includes the following basic steps:
(1) Planning the scope of floating islands and construction blocks;
(2) Isolate the planned floating island range from the surrounding soil;
(3) Build pontoon units around the floating island;
(4) Surrounding cleaning and buoyancy force calculation before reservoir filling;
(5) After the floating island floated, waterproof construction is carried out in the bottom buoyancy structure.

The basic steps proposed by the present invention include the following technical details:

The said step (1), planning the scope of the floating island and construction blocks refers to:

1.1 The measurement needs to be taken as a whole with the details of the soil that will transplant the area. A layout of the plan and many cross-sections of the overall site, to indicate the position of each plant, and the edge curve of the canopy of each plant in the plan need to be displayed. The plants' outer edges are connected to each other.

1.2 To measure the root range, seismic method or shallow exploration method is used to detect the root range of each plant and the root density distribution of each plant; seismic method refers to the method of acquiring ground structures by vibration, and shallow exploration refers to using the distribution of root density in the whole area is obtained by uniform drilling;

1.3 The measured root range and canopy edge are displayed on the site plan at the same time, And the root cutting range is determined according to common knowledge of transplanting or root sonar measurement; the larger canopy edge and root cutting range are taken as the floating island range.

1.4 Set up construction blocks inside the floating island. When setting blocks, the construction difficulty and root system distribution are comprehensively considered, at least one construction shaft at the corner of each block should be left.

The said step (2), isolate the planned floating island range from the surrounding soil means:

2.1 Build a double-layer structure: Through the construction of shafts and horizontal holes, each construction block is constructed into a stable double-layer structure, of which the upper structure is for vegetation, named vegetation structure, and the lower structure is for gaining buoyancy force, named bottom buoyancy structure. The depth of the bottom buoyancy structure is 1.5 times the theoretical excavation depth for traditional transplanting; the depth of the bottom buoyancy structure is calculated according to the theoretical weight of the vegetation structure so that the buoyancy provided by the bottom buoyancy structure can meet the buoyancy required from the floating island, and provide an additional 15% buoyancy as a safety redundancy;

2.2 Build a supporting platform: Use high-pressure grouting to solidify the concrete below the lower structure as a supporting platform for the upper double-layer structure;

2.3 The segmentation of the vegetation structure and the bottom buoyancy structure: many horizontal construction holes are planned at the bottom of the vegetation structure, they run through the entire floating island in the horizontal direction, and the steel pipe be installed in the holes, which provide structural supporting for the floating island. The height of the horizontal hole is not more than 2 m, the interior of the horizontal holes is supported by columns, and the grouting holes are opened on the side to perform high-pressure grouting between the horizontal holes. Therefore, the vegetation structure bottom plate is formed between the vegetation structure bottom and the bottom buoyancy structure with thickness around 2 m;

2.4 Reinforcement of the vegetation structure: To avoid sandy soil leakage around the vegetation structure, use continuous steel sheet piles to enclose the vegetation structure edge, and use prestressed anchors anchoring;

2.5 Reinforcement of the bottom buoyancy structure: continuous steel sheet piles are used for segmentation, and light steel piles are used for support in the longitudinal direction of the bottom buoyancy structure;

2.6 Steps for replacing soil in the bottom buoyancy structure: 1) Use high-pressure water gun method or excavation method to remove the sand in the bottom buoyancy structure; 2) Use high-pressure injection molding or steel plate welding to build a buoyancy structure in the bottom buoyancy structure.

The injection molding method refers to: sprinkling the sand with a high-pressure water gun in the bottom buoyancy structure, and then use the sand mining stirring and suction machines to stir and suck to empty the bottom buoyancy structure 6 space, and use the high-pressure injection molding method to inject the waterproof geofoam; the filling process is from top to bottom, and it is injected in layers, and the height of each layer does not exceed the thickness of the vegetation structure; the geofoam quickly condenses to form a floating body unit.

The excavation method refers to the method of horizontal excavation in the bottom buoyancy structure, excavating the sand in the bottom buoyancy structure, and the space is supported by a steel structure and welded with thin steel plates to form a floating box.

2.7 Separate the floating island range from the surrounding soil through excavation. The excavation section is a triangle or trapezoid with a small bottom side and a large topside, and the slope on both sides are the natural sliding repose angle of sand; consider 2.4 Continuous steel sheet piles are installed in the strengthening step of the vegetation structure. Generally, vertical excavation can be carried out on the outside of the continuous steel sheet piles on the floating island. The triangular or trapezoidal section with a small top and large side is excavated. After excavation, the soil is retained on the outside of the continuous steel sheet pile 10, so that the bottom side of the continuous steel sheet pile still has an earth pressure balance which is named balance soil.

The said step (3), build a floating box device around the floating island; build a floating box device in the excavation trench around the floating island, the section of the floating box device is a triangular section formed by excavation and separation, and the floating box device is welded on the floating island through the horizontal hole steel pipe. Become part of the floating island, help the floating island float and balance.

Island floating: When the reservoir begins to fill, the soil outside the continuous steel sheet pile is soaked, and the soil vibration device is used to liquefy it, the soil collapses naturally, and the bottom buoyancy structure at the bottom of the floating island and the surrounding floating box device is subjected to buoyancy. The upward movement of the overall floating island is further separated from the surrounding soil.

The said step (5), after the island floated, the waterproof construction is carried out in the bottom buoyancy structure, which means that if the bottom buoyancy structure adopts the excavation method after the floating island is floated, the construction personnel enter the bottom buoyancy structure through the construction shaft and the horizontal holes in the early stage of construction. Waterproof welding is carried out in the body, and injection filling is carried out after all visible leaks have been eliminated.

Advantages of the Invention

Advantages

The advantages of the present invention include:

1, The invention provides a brand-new integral floating island transplanting method for vegetation;

2, The invention preserves all the root systems of vegetation and most of the original soil, improves the survival rate, and maintains the unique landscape of the pristine habitat;

3, Because the present invention solidifies and floats the original soil body of the reservoir, the floating island can be constructed at the same time during the construction of the water conservancy project, which saves the construction period, saves the cost, and facilitates the overall scheduling of the site.

BRIEF DESCRIPTION OF DRAWINGS

Description of Drawings

Figure 1:
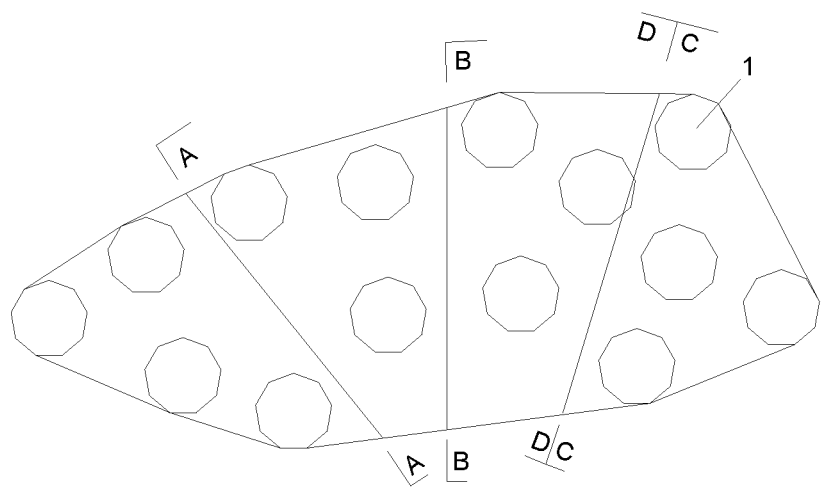
Figure 2:
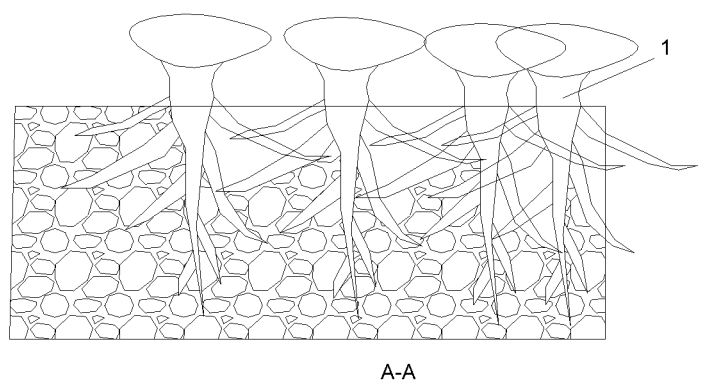
Figure 3:
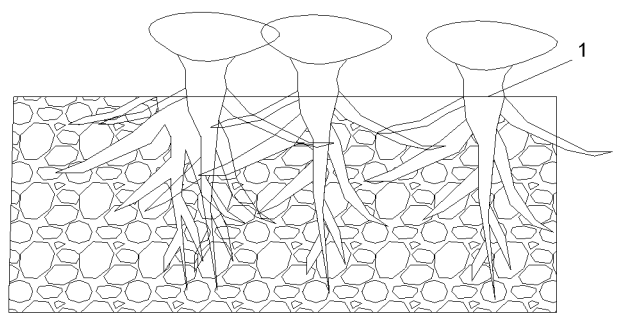
Figure 4:
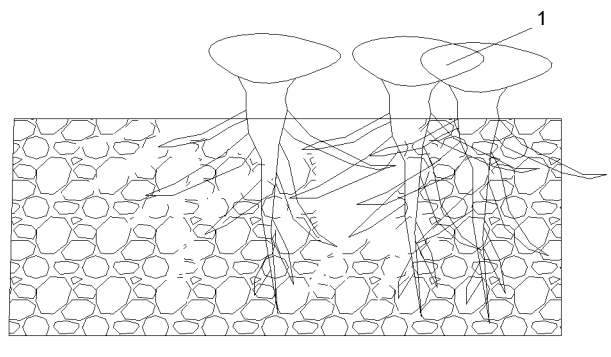
Figure 5:
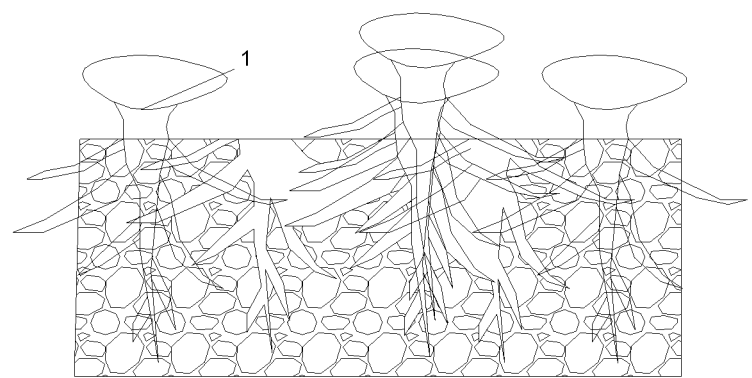
Figure 6:
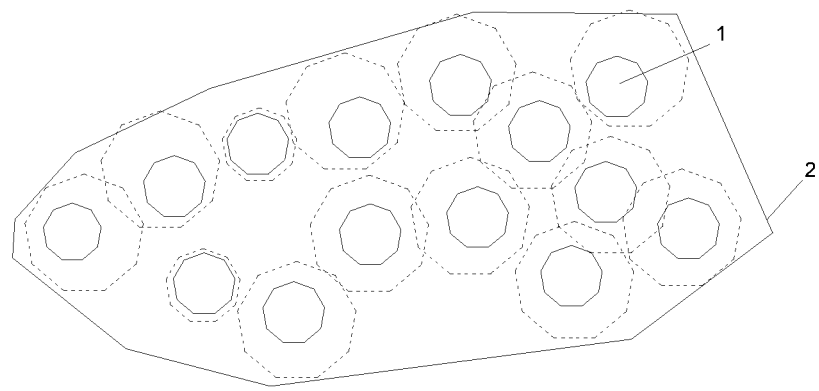
Figure 7:
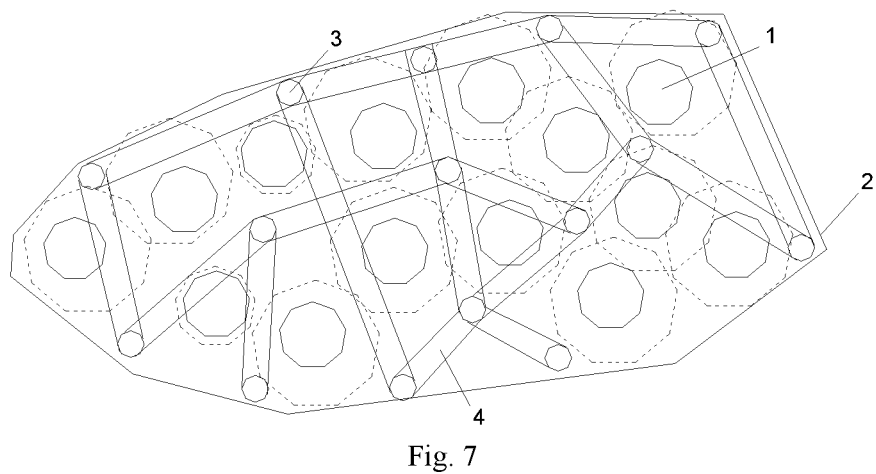
Figure 8:
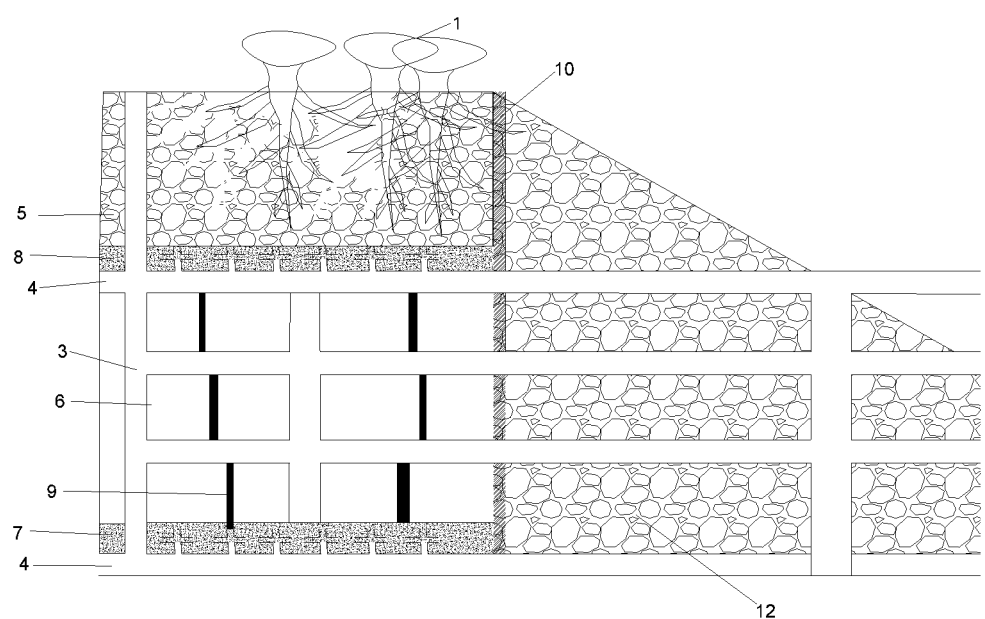
Figure 9:
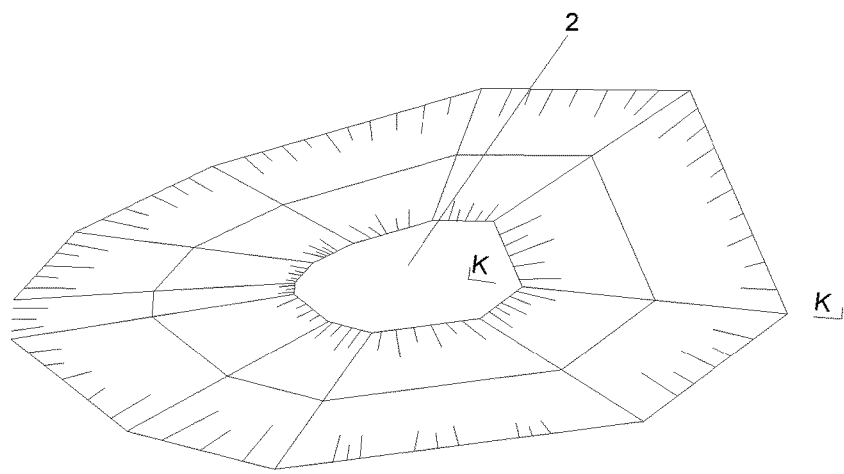
Figure 10:
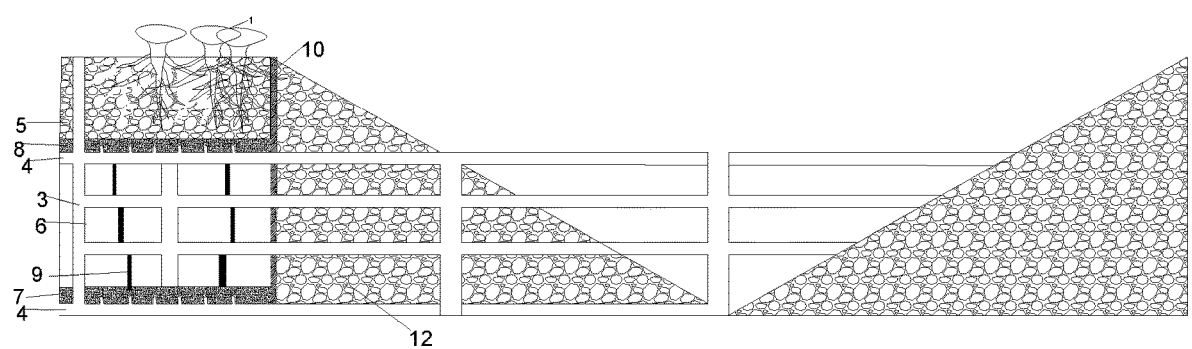
Figure 11:
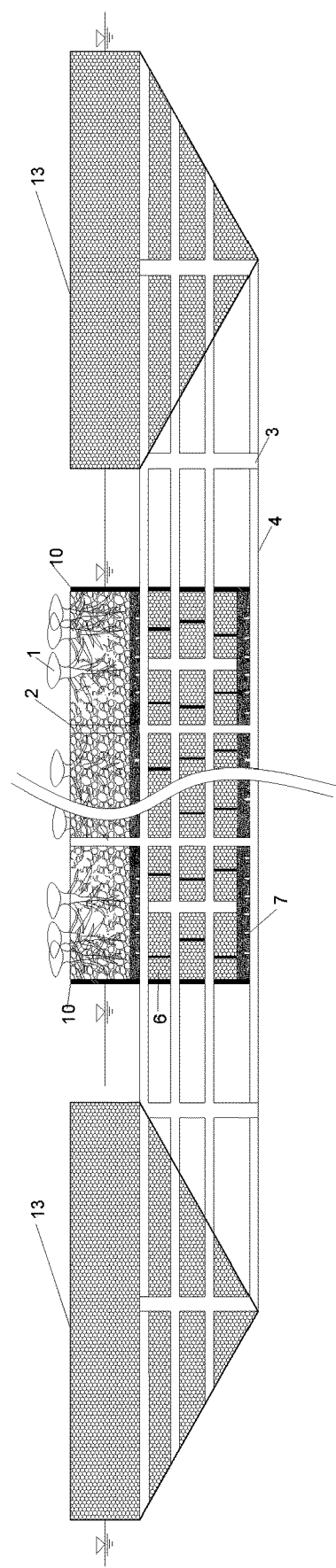

FIG. 1 is an extent of the floating island schematic diagram of the present invention;

FIG. 2 is A-A cross-sectional schematic diagram;

FIG. 3 is B-B cross-sectional schematic diagram;

FIG. 4 is C-C cross-sectional schematic diagram;

FIG. 5 is D-D cross-sectional schematic diagram;

FIG. 6 the present invention comprises the schematic diagram of the planning floating island scope of the canopy and root system distribution;

FIG. 7 is a schematic diagram of the layout of planning and construction blocks and construction shafts and horizontal holes of the present invention;

FIG. 8 is a schematic cross-sectional view of the vegetation structure of the present invention and the bottom buoyancy structure;

FIG. 9 is a schematic plan view of the surrounding excavation of the present invention;

FIG. 10 is a schematic cross-sectional view of the bottom buoyancy structure by the excavation method of the present invention and the separation of the surrounding excavation;

FIG. 11 is a schematic cross-sectional view of the final floating state of the present invention.

INVENTION EMBODIMENT

Embodiments of the Present Invention

Embodiments are given below in conjunction with the accompanying drawings and the present invention is described in detail.

EXAMPLE 1

The method of transplanting *Tamarix tamariskica* is carried out by adopting a floating island structure method of overall transplanting of sandy soil plants.

Specifically, it includes the following basic steps:

(1) Planning the scope of the floating island and the construction blocks; FIG. 1 shows the distribution of plants and the scope of the planned floating island; Plant 1 is within the scope of the planned floating island;

(2) Isolate the planned floating island range from the surrounding soil;

(3) Build pontoon units around the floating islands;

(4) Surrounding cleaning and buoyancy force calculation before reservoir filling;

(5) After the floating island floated, waterproof construction is carried out in the bottom buoyancy structure.

The basic steps proposed by the present invention include the following technical details:

Step (1), planning the scope of the floating island and construction blocks refer to:

1.1 The measurement needs to be taken as a whole with the details of the soil that will transplant the area. A layout of the plan and many cross-sections of the overall site, to indicate the position of each plant, and the edge curve of the canopy of each plant in the plan need to be displayed. The plants' outer edges are connected to each other.

1.2 To measure the root range, seismic method or shallow exploration method is used to detect the root range of each plant and the root density distribution of each plant; seismic method refers to the method of acquiring ground structures by vibration, and shallow exploration refers to using the distribution of root density in the whole area is obtained by uniform drilling;

FIG. 2, FIG. 3, FIG. 4, FIG. 5 are the canopy characteristics and root system characteristics of the planning area obtained by different methods;

1.3 The measured root range and canopy edge are displayed on the site plan at the same time, And the root cutting range is determined according to common knowledge of transplanting or root sonar measurement; the larger canopy edge and root cutting range are taken as the floating island range. FIG. 6 shows the cutting range of the canopy edge and root and obtains the floating island range 2.

1.4 Set up construction blocks within the floating island range 2. The construction difficulty and root system distribution are comprehensively considered when constructing blocks, so that there is a construction shaft at the corner of each construction block, and the block can meet the requirements of overall stability. The layout of block and construction shafts 3 and horizontal holes 4 is shown in FIG. 7.

Step (2), isolate the planned floating island range from the surrounding soil means:

2.1 Building a double-layer structure: through the construction of shafts and horizontal holes, each construction block is constructed into a stable double-layer structure, wherein the upper structure is the vegetation structure 5, and the lower structure is the bottom buoyancy structure 6; The depth of the ground surface downward is 1.5 times the theoretical excavation depth for transplanting; the depth of the bottom buoyancy structure 6 is calculated according to the theoretical weight of the vegetation structure, so that the buoyancy provided by the bottom buoyancy structure 6 can meet the buoyancy required by the floating island, and is Provides an additional 15% buoyancy as a safety redundancy;

2.2 Build a supporting platform: use high-pressure grouting to solidify the bottom buoyancy structure 6 as concrete shell and supporting platform 7 as the upper layer of the double-layer structure;

2.3 The segmentation of the vegetation structure 5 and the bottom buoyancy structure 6: many horizontal construction holes 4 are planned at the bottom of the vegetation structure, they run through the entire floating island in the horizontal direction, and the steel pipe be installed in the holes, which provides the structural supporting for the floating island. The height of the horizontal holes 4 is not more than 2 m, the interior of the horizontal holes is supported by columns, and the grouting holes are opened on the side to perform high-pressure grouting between the horizontal holes 4. Therefore, the vegetation structure bottom plate is formed between the vegetation structure 5 bottom and the bottom buoyancy structure 6 with thickness around 2 m;

2.4 Reinforcement of the vegetation structure 5: To avoid sandy soil leakage around the vegetation structure 5, continuous steel sheet piles 10 enclose the vegetation structure edge, and use prestressed anchors anchoring;

2.5 Reinforcement of the bottom buoyancy structure 6: continuous steel sheet piles 10 are used for segmentation, and light steel piles 9 are used for support in the longitudinal direction of the bottom buoyancy structure 6;

2.6 Steps for replacing soil in the bottom buoyancy structure 6: 1) Use high-pressure water gun method or excavation method to remove the sand in the bottom buoyancy structure 6; 2) Use high-pressure injection molding or steel plate welding to build a buoyancy structure in the bottom buoyancy structure 6.

The injection molding method refers to: sprinkling the sand with a high-pressure water gun in the bottom buoyancy structure 6, and then using the sand mining stirring and suction machines to stir and suck to empty the sandy space, and use the high-pressure injection method to inject the waterproof geofoam; the filling process is from top to bottom, and it is injected in layers, and the height of each layer does not exceed the thickness of the vegetation structure; the geofoam quickly condenses to form a floating body unit.

The excavation method refers to the method of horizontal excavation in the bottom buoyancy structure, excavating the sand in the bottom buoyancy structure, and the space is supported by a steel structure and welded with thin steel plates to form a floating box.

2.7 Separate the floating island range 2 from surrounding soil through excavation. The excavation section 11 is a triangle or trapezoid with a small bottom and a large topside, and the slope on both sides is a sandy natural sliding repose angle. Considering 2.4 Continuous steel sheet piles 10 are installed in the strengthening step of the vegetation structure 5. Generally, vertical excavation can be carried out on the outside of the continuous steel sheet piles 10 on the floating island. The triangular or trapezoidal section with a small top and large downside is excavated. After excavation, the soil is still retained on the outside of the continuous steel sheet pile 10, so that the bottom side of the continuous steel sheet pile 10 still has an earth pressure balance, which is named balance soil 12.

Step (3), build a floating box device around the floating island include: build a floating box device 13 in the excavation trench around the floating island, the section of the floating box device 13 is a triangular section formed by excavation and separation, and the floating box device 13 is welded on the floating island through the horizontal hole steel pipe. Become part of the floating island, help the floating island float and balance.

Island floating: When the reservoir starts to fill, the soil outside of the continuous steel sheet pile is soaked, and the soil vibration device is used to liquefy it, and the soil collapses naturally, and the bottom buoyancy structure 6 at the bottom of the floating island and the surrounding floating box device is subjected to buoyancy. The upward movement of the overall floating island is further separated from the surrounding soil.

Step (5), after the island is floated, the waterproof construction is carried out in the bottom buoyancy structure 6, which means that if the bottom buoyancy structure adopts the excavation method after the floating island is floated, the construction personnel enter the bottom buoyancy structure 6 through the construction shaft and the horizontal holes in the early stage of construction. Waterproof welding is carried out in the body, and injection filling is carried out after all visible leaks have been eliminated.

The invention claimed is:

1. A floating island construction method for overall transplanting of sandy soil plants comprising the steps of:
   planning a scope of a floating island and construction blocks, wherein the step of planning comprises the sub-steps of:
      displaying a layout of a site plan including the sandy soil plants and several cross-sections of the site plan to indicate a position of each of the sandy soil plants, and a canopy edge of each of the sandy soil plants, wherein outer edges of the sandy soil plants are connected to each other;
      detecting a root range and a root density distribution of each of the sandy soil plants by using a seismic method or a shallow exploration method, wherein the seismic method includes acquiring ground structures by vibration, and the shallow exploration method includes using a distribution of root density in a whole area obtained by uniform drilling;
      displaying the root range and canopy edge of each of the sandy soil plants on the site plan at the same time, wherein the root cutting range is determined according to common knowledge of transplanting or root sonar measurement;
      determining a floating island range according to the canopy edge and the root range of each of the sandy soil plants; and
      setting up the construction blocks inside the floating island, wherein the each of the construction blocks includes at least one construction shaft at a corner thereof and horizontal construction holes;
   isolating the floating island range from a surrounding soil, wherein the step of planning comprises the sub-steps of:
      building a double-layer structure for each of the construction blocks through constructions of the construction shafts and horizontal holes, wherein the double-layer structure includes an upper structure as a vegetation structure, and a lower structure as a bottom buoyancy structure, a depth of the vegetation structure from a ground surface downward is 1.5 times a theoretical excavation depth for traditional transplanting, a depth of the bottom buoyancy structure is calculated according to a theoretical weight of the vegetation structure so that buoyancy provided by the bottom buoyancy structure meets a buoyancy required from the floating island, and an additional 15% buoyancy is provided as a safety redundancy;
      building a supporting platform by using high-pressure grouting to solidify concrete below the bottom buoyancy structure to form a supporting platform for the double-layer structure;
      performing a segmentation of the vegetation structure and the bottom buoyancy structure by planning the horizontal construction holes at a bottom of the vegetation structure; the horizontal construction holes running through an entire floating island in a horizontal direction; installing steel pipes in the horizontal construction holes for structurally supporting the floating island; a height of the horizontal construction hole being no more than 2 m, an interior of the horizontal construction holes being supported by columns; and opening grouting holes on a side of the horizontal construction holes to perform high-pressure grouting between the horizontal construction holes to form a vegetation structure bottom plate between the bottom of the vegetation structure and the bottom buoyancy structure;
      performing a reinforcement of the vegetation structure to avoid sandy soil leakage around the vegetation structure, by using continuous steel sheet piles to enclose an edge of the vegetation structure, and prestressed anchors for anchoring;
      performing a reinforcement of the bottom buoyancy structure by using continuous steel sheet piles for segmentation, and steel piles for support in a longitudinal direction of the bottom buoyancy structure;
      replacing soil in the bottom buoyancy structure by using a high-pressure water gun method or an excavation method to remove sand in the bottom buoyancy structure, and by using a high-pressure injection molding or a steel plate welding to build a buoyancy structure in the bottom buoyancy structure; and
      separating the floating island range from the surrounding soil through excavation by carrying out a vertical excavation on an outside of the continuous steel sheet piles used in the reinforcement of the vegetation structure on the floating island; excavating an excavation section, the excavation section being a triangle or trapezoid with a small bottom side and a large topside, and slopes on both sides being natural sliding repose angle of sand; and after excavation, retaining soil on the outside of the continuous steel sheet piles used in the reinforcement of the vegetation structure, so that a bottom side of the continuous steel sheet piles still has an earth pressure balance as a balance soil;
   building pontoon units around the floating islands;
   performing surrounding cleaning and buoyancy force calculation before reservoir filling; and
   carrying out waterproof construction after the floating island is floated, wherein the waterproof construction is carried out in the bottom buoyancy structure.

2. The floating island construction method of a kind of sandy soil plant integral transplanting according to claim 1, wherein:
   the step of building pontoon units further comprises building a floating box device in a excavation trench around the floating island, the floating box device having a triangular section formed by excavation and separation, and being welded on the floating island through the steel pipes in the horizontal construction holes so as to become part of the floating island, and help the floating island float and balance; and
   the step of carrying out waterproof construction further comprises carrying out the waterproof construction in the bottom buoyancy structure by carrying out a waterproof welding in a body of the bottom buoyancy structure, and carrying out an injection filling after all visible leaks have been eliminated.

* * * * *